(12) United States Patent
Hiyoshi

(10) Patent No.: US 11,558,530 B2
(45) Date of Patent: Jan. 17, 2023

(54) COMMUNICATION SYSTEM, FACSIMILE APPARATUS, AND METHOD FOR CONTROLLING COMMUNICATION SYSTEM

(71) Applicant: SEIKO EPSON CORPORATION, Tokyo (JP)

(72) Inventor: Rina Hiyoshi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/201,765

(22) Filed: Mar. 15, 2021

(65) Prior Publication Data
US 2021/0297552 A1    Sep. 23, 2021

(30) Foreign Application Priority Data

Mar. 19, 2020  (JP) .............................. JP2020-048811

(51) Int. Cl.
  *H04N 1/00*  (2006.01)
  *H04N 1/32*  (2006.01)

(52) U.S. Cl.
  CPC ..... *H04N 1/32117* (2013.01); *H04N 1/00206* (2013.01); *H04N 1/32096* (2013.01)

(58) Field of Classification Search
  None
  See application file for complete search history.

(56) References Cited

U.S. PATENT DOCUMENTS

| | | | | |
|---|---|---|---|---|
| 5,712,712 A | * | 1/1998 | Sayward | H04N 1/00204 358/403 |
| 6,359,974 B1 | * | 3/2002 | Ishibashi | H04N 1/32406 379/100.06 |
| 2005/0190402 A1 | * | 9/2005 | Nakamura | H04N 1/00212 358/1.15 |
| 2005/0278412 A1 | * | 12/2005 | Iida | H04N 1/00204 709/201 |
| 2007/0121147 A1 | * | 5/2007 | Corona | G06F 3/126 358/1.15 |
| 2008/0080015 A1 | * | 4/2008 | Mizumukai | H04N 1/00209 358/442 |

(Continued)

FOREIGN PATENT DOCUMENTS

| | | | | |
|---|---|---|---|---|
| JP | H1056551 | * | 2/1998 | H04N 1/00 |
| JP | 2018152676 A | | 9/2018 | |

*Primary Examiner* — Beniyam Menberu
(74) *Attorney, Agent, or Firm* — Chip Law Group

(57) ABSTRACT

A communication system includes an information processing apparatus and a facsimile apparatus connected to the information processing apparatus. The information processing apparatus transmits, to the facsimile apparatus, first job information that includes a single piece of first image information and includes two or more pieces of address information that respectively indicate addresses of transmission destinations of the first image information. When the first job information is received from the information processing apparatus, based on the two or more pieces of address information that are included in the received first job information, the facsimile apparatus broadcasts the first image information by facsimile communication to the addresses indicated respectively by the two or more pieces of address information.

7 Claims, 9 Drawing Sheets

(56) References Cited

U.S. PATENT DOCUMENTS

| | | | |
|---|---|---|---|
| 2009/0231603 A1* | 9/2009 | Takemoto | H04N 1/00209 358/1.9 |
| 2010/0073719 A1* | 3/2010 | Fukushima | H04N 1/00347 358/1.15 |
| 2013/0003114 A1* | 1/2013 | Maehira | H04N 1/00206 358/1.15 |
| 2013/0293933 A1* | 11/2013 | Rebert | H04N 1/00281 358/407 |
| 2018/0262628 A1 | 9/2018 | Uruma | |
| 2019/0222712 A1* | 7/2019 | Nakamura | G06Q 10/10 |

* cited by examiner

FIG. 8

| STATUS INFORMATION | | |
|---|---|---|
| ADDRESS INFORMATION | COMMUNICATION STATE INFORMATION | COMMUNICATION PROGRESS INFORMATION |
| xxx1 | BROADCAST TRANSMISSION | TRANSMITTING NOW |
| xxx2 | BROADCAST TRANSMISSION | TRANSMITTING NOW |
| xxx3 | BROADCAST TRANSMISSION | WAITING NOW TO REDIAL |
| xxx4 | BROADCAST TRANSMISSION | TRANSMITTING NOW |
| ... | ... | ... |
| xxx100 | BROADCAST TRANSMISSION | WAITING |
| xxx101 | MEMORY TRANSMISSION | WAITING |

FIG. 10

| CHANNEL ID | STATUS INFORMATION | | |
|---|---|---|---|
| | COMMUNICATION STATE INFORMATION | ADDRESS INFORMATION | COMMUNICATION PROGRESS INFORMATION (THE NUMBER OF ALREADY-TRANSMITTED PAGES/ TOTAL PAGES) |
| ch1 | BROADCAST TRANSMISSION | xxx1 | TRANSMITTING NOW (3/10) |
| ch2 | BROADCAST TRANSMISSION | xxx2 | TRANSMITTING NOW (0/10) |
| ch3 | BROADCAST TRANSMISSION | xxx3 | TRANSMITTING NOW (0/10) |
| ... | ... | ... | ... |

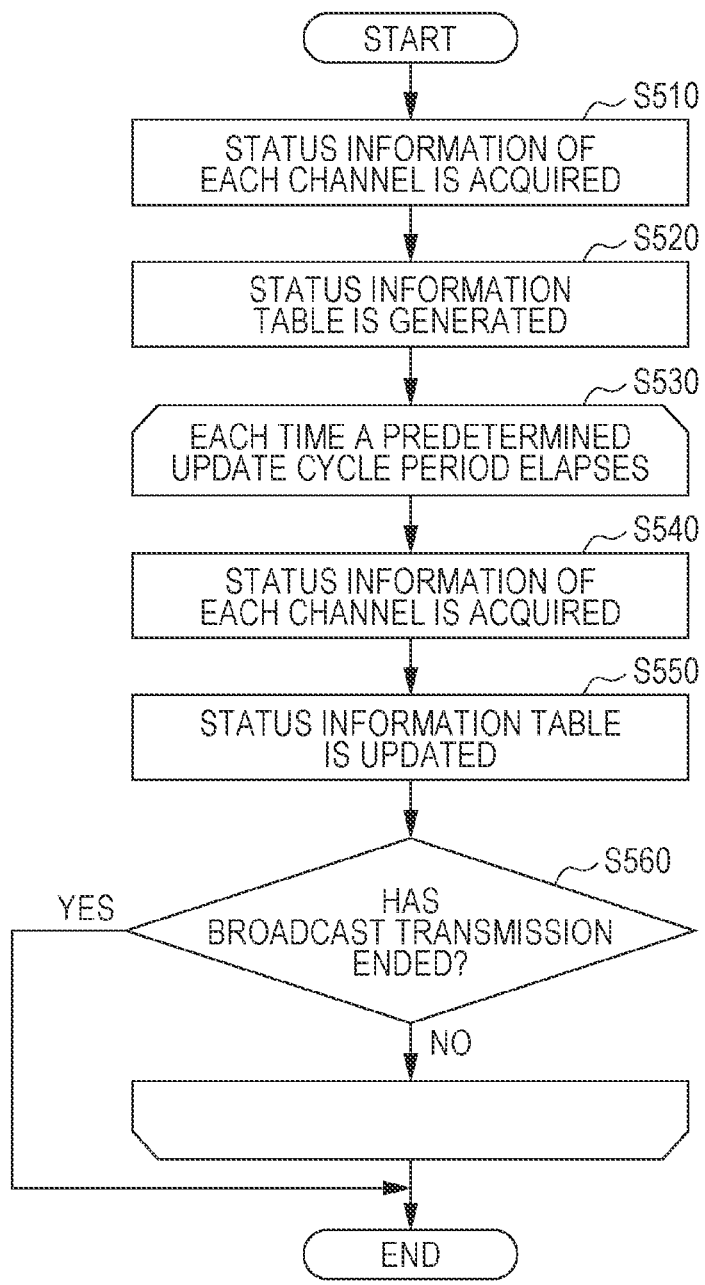

COMMUNICATION SYSTEM, FACSIMILE APPARATUS, AND METHOD FOR CONTROLLING COMMUNICATION SYSTEM

The present application is based on, and claims priority from JP Application Serial Number 2020-048811, filed Mar. 19, 2020, the disclosure of which is hereby incorporated by reference herein in its entirety.

BACKGROUND

1. Technical Field

Embodiments of the present disclosure relate to a communication system, a facsimile apparatus, and a method for controlling a communication system.

2. Related Art

Research and development on facsimile communication have been conducted.

In this regard, an information processing apparatus that causes a facsimile apparatus to perform facsimile transmission is known, as disclosed in JP-A-2018-152676. Facsimile transmission is transmission of image information by facsimile communication.

When the information processing apparatus disclosed in JP-A-2018-152676 causes a facsimile apparatus to perform facsimile transmission, the information processing apparatus transmits job information corresponding to an inputted operation to the facsimile apparatus. The job information is information that includes image information corresponding to the operation and address information corresponding to the operation. The image information corresponding to the operation is information that represents an image selected in accordance with the operation. The address information corresponding to the operation is information that indicates the address of the transmission destination selected in accordance with the operation as the transmission destination to which the image information is to be addressed and sent. When the job information is received from the information processing apparatus, the facsimile apparatus stores the received job information temporarily. Then, the facsimile apparatus transmits the image information included in the job information to the address indicated by the address information included in the job information stored temporarily. Facsimile communication performed in this way is sometimes called as PC-FAX.

The information processing apparatus disclosed in JP-A-2018-152676 is able to cause a facsimile apparatus to perform facsimile broadcast transmission, too. Facsimile broadcast transmission is broadcast transmission of image information by facsimile communication. When the information processing apparatus causes a facsimile apparatus to perform facsimile broadcast transmission, the information processing apparatus transmits pieces of job information corresponding to an inputted operation to the facsimile apparatus. Each of the pieces of job information includes the same image information as that of the others. In addition, each of the pieces of job information includes address information that indicates an address that is different from addresses for the others. When the pieces of job information are received from the information processing apparatus, the facsimile apparatus stores the received pieces of job information temporarily. Then, for each of the pieces of job information stored temporarily, the facsimile apparatus transmits the image information included in this job information to the address indicated by the address information included in this job information. The facsimile apparatus performs facsimile broadcast transmission in this way.

In the information processing apparatus disclosed in JP-A-2018-152676, the larger the number of transmission destinations to which image information is to be transmitted in facsimile broadcast transmission, the larger the number of pieces of job information stored temporarily in the facsimile apparatus. However, the memory capacity of the facsimile apparatus is limited. Therefore, the shortage of memory capacity of the facsimile apparatus could occur in related art when the information processing apparatus causes the facsimile apparatus to perform facsimile broadcast transmission.

SUMMARY

A communication system according to a certain aspect of the present disclosure includes an information processing apparatus and a facsimile apparatus connected to the information processing apparatus; the information processing apparatus transmits, to the facsimile apparatus, first job information that includes a single piece of first image information and includes two or more pieces of address information that respectively indicate addresses of transmission destinations of the first image information; when the first job information is received from the information processing apparatus, based on the two or more pieces of address information that are included in the received first job information, the facsimile apparatus broadcasts the first image information by facsimile communication to the addresses indicated respectively by the two or more pieces of address information.

A facsimile apparatus according to a certain aspect of the present disclosure is connected to an information processing apparatus and is configured to, when first job information that includes a single piece of first image information and includes two or more pieces of address information that respectively indicate addresses of transmission destinations of the first image information is received from the information processing apparatus, based on the two or more pieces of address information that are included in the received first job information, broadcast the first image information by facsimile communication to the addresses indicated respectively by the two or more pieces of address information.

A control method according to a certain aspect of the present disclosure is a method for controlling a communication system that includes an information processing apparatus and a facsimile apparatus connected to the information processing apparatus, the method comprising: a first step of transmitting, by the information processing apparatus to the facsimile apparatus, first job information that includes a single piece of first image information and includes two or more pieces of address information that respectively indicate addresses of transmission destinations of the first image information; and a second step of, when the first job information is received by the facsimile apparatus from the information processing apparatus, based on the two or more pieces of address information that are included in the received first job information, broadcasting the first image information by facsimile communication by the facsimile apparatus to the addresses indicated respectively by the two or more pieces of address information.

BRIEF DESCRIPTION OF THE DRAWINGS

FIG. 8 is a diagram that illustrates an example of a status image.

FIG. 10 is a diagram that illustrates an example of a status information table.

FIG. 11 is a diagram that illustrates an example of the flow of processing for generating a status information table and updating the status information table by the multifunction peripheral.

DESCRIPTION OF EXEMPLARY EMBODIMENTS

Embodiments

With reference to the accompanying drawings, embodiments of the present disclosure will now be explained.

Overview of Communication System

First, an overview of a communication system according to an exemplary embodiment is presented below. In the embodiment described below, when the term "broadcast transmission" is used alone, it means broadcast transmission by facsimile communication.

A communication system according to an exemplary embodiment includes an information processing apparatus and a facsimile apparatus. The facsimile apparatus is an apparatus that transmits image information that represents an image by facsimile communication. The facsimile apparatus is connected to the information processing apparatus.

The information processing apparatus transmits first job information to the facsimile apparatus. The first job information is information that includes a single piece of first image information and two or more pieces of address information. The two or more pieces of address information are pieces of information that respectively indicate the addresses of transmission destinations that are different from one another. Namely, the information processing apparatus transmits, as the first job information to the facsimile apparatus, information that includes a single piece of first image information and two or more pieces of address information associated with the first image information.

When the first job information is received from the information processing apparatus, based on the two or more pieces of address information included in the received first job information, the facsimile apparatus broadcasts the first image information by facsimile communication to the addresses indicated respectively by the two or more pieces of address information.

By this means, a communication system according to an exemplary embodiment is able to prevent the shortage of memory capacity of the facsimile apparatus in broadcast transmission. In the description below, the configuration of the communication system and processing performed by the communication system will be explained in detail.

The facsimile apparatus described above may be any kind of apparatus as long as it is able to perform facsimile communication. Therefore, in the description below, a case where the facsimile apparatus is a multifunction peripheral that is able to perform facsimile communication is taken as an example.

Configuration of Communication System

Figure 1:
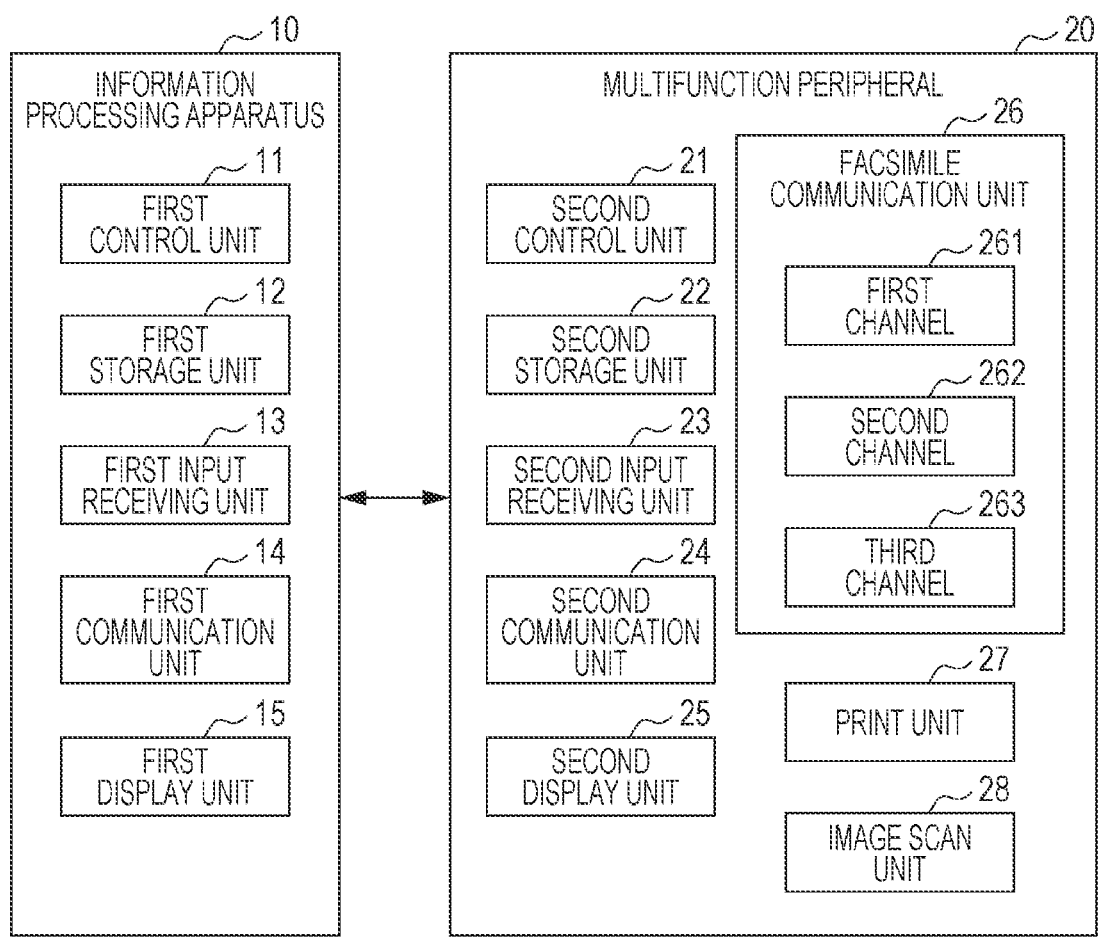
FIG. 1 is a diagram that illustrates an example of the configuration of a communication system.

In the description below, a communication system 1 illustrated in FIG. 1 is taken as an example of a communication system according to an exemplary embodiment. FIG. 1 is a diagram that illustrates an example of the configuration of the communication system 1.

The communication system 1 includes an information processing apparatus 10 and a multifunction peripheral 20.

The information processing apparatus 10 is an example of the information processing apparatus mentioned above. For example, the information processing apparatus 10 is a notebook PC (Personal Computer). Instead of a notebook PC, the information processing apparatus 10 may be other kind of information processing apparatus, for example, a desktop PC, a workstation, a tablet PC, a multifunction portable phone terminal (smartphone), a PDA (Personal Digital Assistant), or the like.

The information processing apparatus 10 is connected to the multifunction peripheral 20 such that communication can be performed therebetween via a wireless network or a wired network. The network may be the Internet, a LAN (Local Area Network), a Wi-Fi®, or other kind of network.

In accordance with a received input of an operation, the information processing apparatus 10 causes the multifunction peripheral 20 to perform transmission by facsimile communication of image information that represents an image corresponding to the operation.

When image information is to be transmitted by facsimile communication, the information processing apparatus 10 generates job information corresponding to the inputted operation. The job information is information that includes a single piece of image information corresponding to the operation and two or more pieces of address information corresponding to the operation. The image information corresponding to the operation is information that represents an image selected in accordance with the operation. The two or more pieces of address information corresponding to the operation are pieces of information that respectively indicate the addresses of two or more transmission destinations selected in accordance with the operation as the transmission destinations to which the image information corresponding to the operation is to be addressed and sent. In addition, the two or more pieces of address information corresponding to the operation are pieces of information that respectively indicate the addresses that are different from one another. The two or more pieces of address information corresponding to the operation indicate, for example, telephone numbers that are different from one another. Each of the two or more pieces of address information corresponding to the operation may be other kind of information that is able to indicate other kind of address instead of a telephone number in transmission of image information corresponding to the operation by facsimile communication.

After the generation of the job information, the information processing apparatus 10 transmits the generated job information to the multifunction peripheral 20. By performing this job transmission, the information processing apparatus 10 causes the multifunction peripheral 20 to perform transmission by facsimile communication of image information included in the job information transmitted to the multifunction peripheral 20.

The multifunction peripheral 20 broadcasts the single piece of image information included in the job information by facsimile communication to the addresses indicated respectively by the two or more pieces of address information included in the job information. In the present embodiment, processing that is performed by the communication system 1 when broadcast transmission is performed is described. Therefore, in the description below, to present an example, the number of pieces of address information included in the job information is assumed to be two or more.

The job information may be information that serves as a trigger for causing the multifunction peripheral 20 to perform broadcast transmission of image information included in the job information. The job information may be information that does not have such a trigger function. If the job information is information that does not have such a trigger function, for example, the information processing apparatus 10 transmits a command that serves as a trigger together with the job information to the multifunction peripheral 20 when the information processing apparatus 10 transmits the job information to the multifunction peripheral 20. A case where the job information serves as a trigger is explained as an example below.

The information processing apparatus 10 includes, for example, a first control unit 11, a first storage unit 12, a first input receiving unit 13, a first communication unit 14, and a first display unit 15.

The first control unit 11 controls the information processing apparatus 10 as a whole. The first control unit 11 is, for example, a CPU (Central Processing Unit). The first control unit 11 may be other kind of processor instead of a CPU. For example, the first control unit 11 may be an FPGA (Field Programmable Gate Array). The first control unit 11 performs various kinds of processing in the information processing apparatus 10 by executing various programs stored in the first storage unit 12.

Examples of the first storage unit 12 include but not limited to HDD (Hard Disk Drive), SSD (Solid State Drive), EEPROM (Electrically Erasable Programmable Read-Only Memory), ROM (Read-Only Memory), and RAM (Random Access Memory). That is, examples of the first storage unit 12 encompass temporary storage devices and non-temporary storage devices. The first storage unit 12 may be an external storage device connected to the information processing apparatus 10 via a digital input/output port, etc. such as a USB (Universal Serial Bus), etc., instead of a storage device built in the information processing apparatus 10. Various kinds of program, image, information, and the like that are to be processed by the first control unit 11 are stored in the first storage unit 12.

The first input receiving unit 13 is, for example, a keyboard, a mouse, a touch pad, or other kind of input device. Instead of those enumerated here, the first input receiving unit 13 may be a touch panel configured integrally to serve also as the first display unit 15.

The first communication unit 14 is configured to include a digital input/output port such as a USB, etc., an Ethernet® port, etc.

The first display unit 15 is, for example, a display panel such as a liquid crystal display panel, an organic EL (ElectroLuminescence) display panel, or the like.

The multifunction peripheral 20 is an example of the multifunction peripheral mentioned above. Therefore, the multifunction peripheral 20 has a function of transmitting image information by facsimile communication. In addition to the function of transmitting image information by facsimile communication, the multifunction peripheral 20 has a print function and an image scan function. The print function is a function of printing an image on a print target medium. The image scan function is a function of reading image information that represents an image printed on a medium from the medium.

The multifunction peripheral 20 is connected to the information processing apparatus 10 such that communication can be performed therebetween via the aforementioned network. The multifunction peripheral 20 is further connected to at least one telephone line. Therefore, for each of at least one telephone line, the multifunction peripheral 20 is able to perform facsimile communication via the telephone line. A case where the multifunction peripheral 20 has three telephone-line-connectable channels is explained as an example below. That is, in this example, the multifunction peripheral 20 has three communication ports for facsimile communication, and the multifunction peripheral 20 is connected to three telephone lines via these communication ports. In this case, the multifunction peripheral 20 is able to transmit image information to a maximum of three transmission destinations in parallel by facsimile communication. In the description below, to facilitate an explanation, these telephone lines are referred to as a first telephone line, a second telephone line, and a third telephone line.

When job information is received from the information processing apparatus 10, based on the received job information, the multifunction peripheral 20 broadcasts image information included in the job information to the addresses indicated respectively by two or more pieces of address information included in the job information. As described earlier, the job information includes a single piece of image information. That is, when broadcast transmission is to be performed, in no case does the multifunction peripheral 20 receive plural pieces of image information the number of which is the same as the number of the two or more pieces of address information. Therefore, the communication system 1 is able to prevent the shortage of memory capacity of the multifunction peripheral 20 in broadcast transmission.

The multifunction peripheral 20 includes a second control unit 21, a second storage unit 22, a second input receiving unit 23, a second communication unit 24, a second display unit 25, a facsimile communication unit 26, a print unit 27, and an image scan unit 28.

The second control unit 21 controls the multifunction peripheral 20 as a whole. The second control unit 21 is, for example, a CPU. The second control unit 21 may be other kind of processor instead of a CPU. For example, the second control unit 21 may be an FPGA. The second control unit 21 performs various kinds of processing in the multifunction peripheral 20 by executing various programs stored in the second storage unit 22.

Examples of the second storage unit 22 include but not limited to HDD, SSD, EEPROM, ROM, and RAM. That is, examples of the second storage unit 22 encompass temporary storage devices and non-temporary storage devices. The second storage unit 22 may be an external storage device connected to the multifunction peripheral 20 via a digital input/output port, etc. such as a USB, etc., instead of a storage device built in the multifunction peripheral 20. Various kinds of program, image, information, and the like that are to be processed by the second control unit 21 are stored in the second storage unit 22.

The second input receiving unit 23 is, for example, a keyboard, a mouse, a touch pad, or other kind of input device. Instead of those enumerated here, the second input receiving unit 23 may be a touch panel configured integrally to serve also as the second display unit 25.

The second communication unit 24 is configured to include a digital input/output port such as a USB, etc., an Ethernet® port, etc.

The second display unit 25 is, for example, a display panel such as a liquid crystal display panel, an organic EL display panel, or the like.

The facsimile communication unit 26 performs facsimile transmission upon request from the first control unit 11. The facsimile communication unit 26 has three communication ports. Having these three communication ports, the facsimile communication unit 26 is configured to be able to use a first channel 261, a second channel 262, and a third channel 263 as the three channels mentioned above. The first channel 261 is a communication channel that is connected to the first telephone line mentioned above. The second channel 262 is a communication channel that is connected to the second telephone line. The third channel 263 is a communication channel that is connected to the third telephone line. A known method may be used for broadcasting, by the facsimile communication unit 26, a certain piece of image information by facsimile communication to a plurality of addresses by using the three channels, that is, the first channel 261, the second channel 262, and the third channel 263. Such broadcast transmission by facsimile communication may be performed using a method to be developed in future. The facsimile communication unit 26 may have a configuration for two channels or less. The facsimile communication unit 26 may have a configuration for four channels or more.

The print unit 27 is a printer device that performs printing on a print target medium upon request from the second control unit 21.

The image scan unit 28 is an image scanner device that, upon request from the second control unit 21, reads image information that represents an image printed on a medium from the medium.

Figure 2:
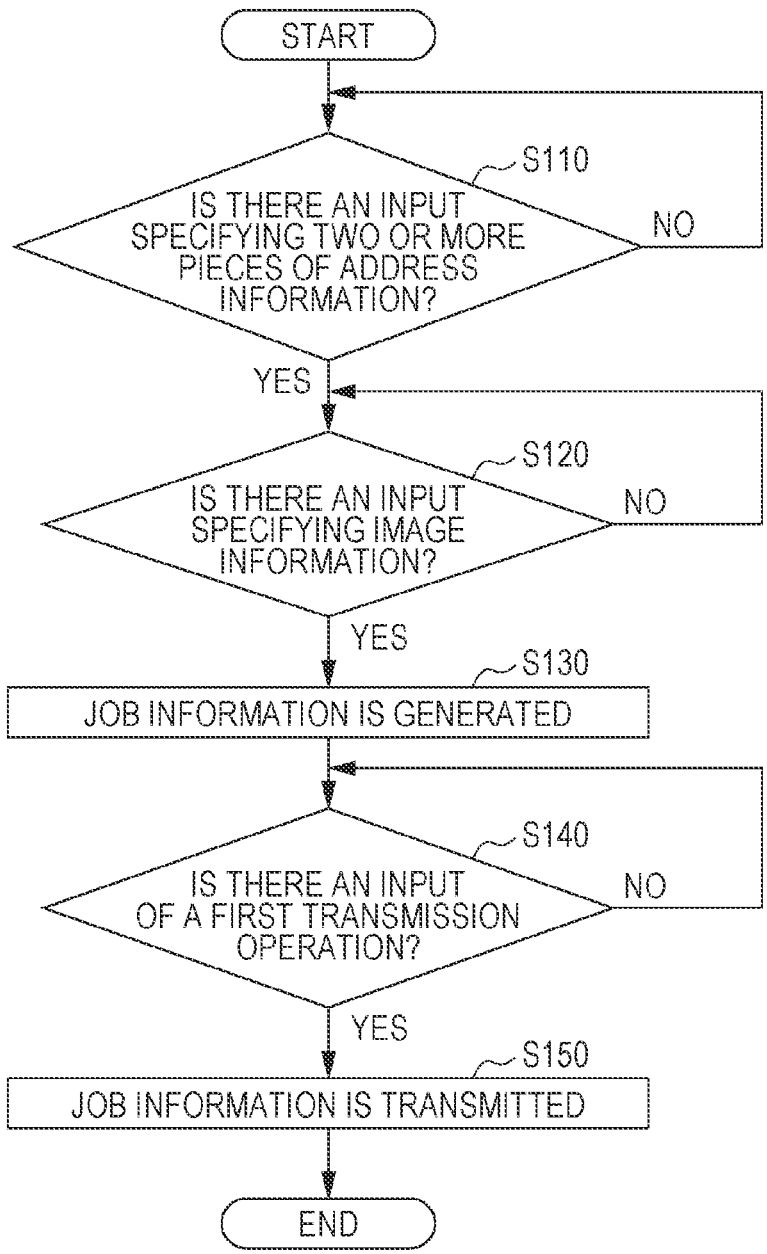
FIG. 2 is a diagram that illustrates an example of the flow of processing for transmitting job information to a multifunction peripheral by an information processing apparatus.

Processing of Transmitting Job Information to Multifunction Peripheral by Information Processing Apparatus Processing of transmitting job information to the multifunction peripheral 20 by the information processing apparatus 10 will now be explained. FIG. 2 is a diagram that illustrates an example of the flow of processing for transmitting job information to the multifunction peripheral 20 by the information processing apparatus 10. In the example described below, it is assumed that an input of an operation for causing the first display unit 15 to display a receiving image has been received by the information processing apparatus 10 at a point in time that is before the execution of processing in a step S110 illustrated in FIG. 2. The receiving image means an image for receiving the user's specifying of image information that is to be transmitted to the multifunction peripheral 20 and the user's specifying of two or more pieces of address information that respectively indicate the addresses of transmission destinations of the image information.

The first control unit 11 waits until two or more pieces of address information that are different from one another are specified by the user via the receiving image displayed on the first display unit 15 (step S110).

Upon determining that two or more pieces of address information that are different from one another have been specified (step S110: YES), the first control unit 11 waits until image information that represents an image which the user wants to be transmitted to the multifunction peripheral 20 is specified by the user via the receiving image displayed on the first display unit 15 (step S120). The sequential order of performing the processing in the step S120 and performing the processing in the step S110 may be reversed. The processing in the step S120 may be performed in parallel with the processing in the step S110.

Upon determining that an input specifying the image information has been received (step S120: YES), the first control unit 11 generates job information that includes the two or more pieces of address information specified in the step S110 and the image information specified in the step S120 (step S130). In the description below, the following case is taken as an example: a case where the two or more pieces of address information, the specifying of which is received by the first control unit 11 in the step S110, are N pieces of first address information, and where the image information, the specifying of which is received by the first control unit 11 in the step S120, is first image information. The term "N pieces of first address information" means N pieces of address information different from one another, the specifying of which is received from the user via the receiving image together with the specifying of the first image information. N may be any integer as long as it is not less than 2. The term "first image information" means image information that represents a first image. In the description below, job information that includes the first image information and the N pieces of first address information is referred to as first job information. The first job information includes a single piece of first image information as image information. However, the first image represented by the first image information may be an image that contains a single page only or an image that contains a plurality of pages.

Next, the first control unit 11 waits until an input of a predetermined first transmission operation is received (step S140). The first transmission operation is an operation that serves as a trigger for causing the information processing apparatus 10 to transmit the first job information to the multifunction peripheral 20. The first transmission operation may be any kind of operation as long as it serves as such a trigger.

Upon determining that an input of the first transmission operation has been received (step S140: YES), the first control unit 11 causes the first communication unit 14 to transmit the first job information generated in the step S130 to the multifunction peripheral 20 (step S150). Then, the first control unit 11 ends the processing illustrated in the flowchart of FIG. 2.

As explained above, the information processing apparatus 10 is able to transmit, to the multifunction peripheral 20, job information that includes a single piece of image information and two or more pieces of address information that respectively indicate the addresses of transmission destinations of the image information. For example, the information processing apparatus 10 is able to transmit, to the multifunction peripheral 20, first job information that includes a single piece of first image information and N pieces of first address information that respectively indicate the addresses of transmission destinations of the first image information.

Processing Performed by Multifunction Peripheral upon Receiving Job Information

Figure 3:
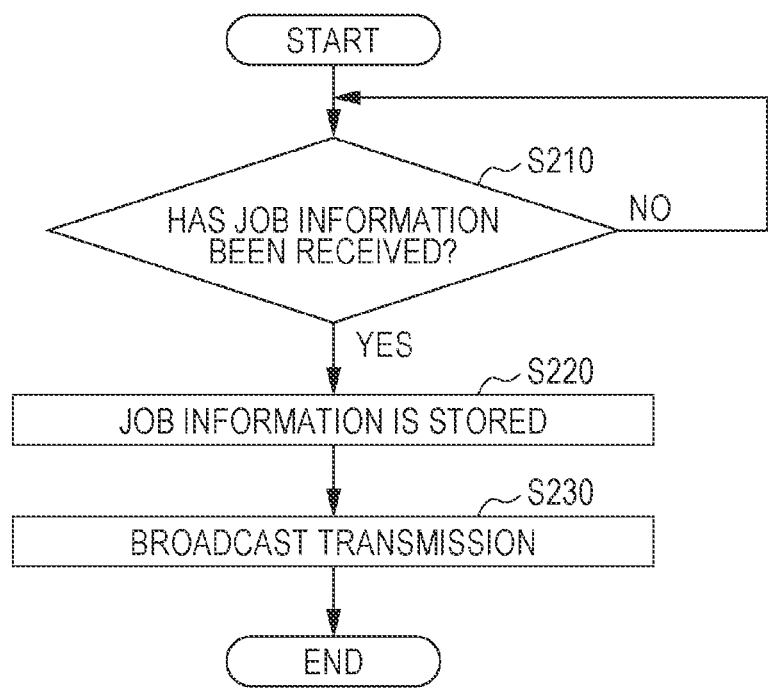
FIG. 3 is a diagram that illustrates an example of the flow of processing performed by the multifunction peripheral upon receiving job information.

Processing performed by the multifunction peripheral 20 upon receiving job information will now be explained. FIG. 3 is a diagram that illustrates an example of the flow of processing performed by the multifunction peripheral 20 upon receiving job information.

The second control unit 21 waits until job information is received (step S210).

Upon determining that job information has been received (step S210: YES), the second control unit 21 causes the second storage unit 22 to store the received job information (step S220). A case where the second control unit 21 receives the first job information in the step S210 is explained as an example below. That is, in this example, the second control unit 21 causes the second storage unit 22 to store the received first job information in the step S220.

Next, based on the first job information stored by the second storage unit 22 in the step S220, the second control unit 21 commands that the first image information included in the first job information should be broadcast by facsimile communication to the addresses indicated respectively by the N pieces of first address information included in the first job information (step S230). More specifically, in the step S230, the second control unit 21 controls the facsimile communication unit 26 so as to broadcast the first image information by facsimile communication to the addresses indicated respectively by the N pieces of first address information by using the first channel 261, the second channel 262, and the third channel 263.

After finishing the transmission of the first image information to all of the addresses indicated respectively by the N pieces of first address information in the step S230, the second control unit 21 ends the processing illustrated in the flowchart of FIG. 3.

As explained above, upon receiving job information, the multifunction peripheral 20 causes the second storage unit 22 to store the received job information. Then, the multifunction peripheral 20 broadcasts, by facsimile communication, the image information stored by the second storage unit 22 to the addresses indicated respectively by the two or more pieces of address information included in the job information stored by the second storage unit 22. By this means, the multifunction peripheral 20 is able to prevent the shortage of memory capacity of the multifunction peripheral 20, that is, memory capacity of the second storage unit 22, in broadcast transmission.

The job information explained above may be configured to include correspondence information that provides correspondences between the image information included in the job information and the two or more pieces of address information included in the job information. For example, the correspondence information is information for association between an image information ID for identifying the image information and address information IDs for respectively identifying the two or more pieces of address information. In this case, the image information ID for identifying the image information is pre-assigned to the image information included in the job information, with a correspondence. In addition, in this case, to each of the two or more pieces of address information included in the job information, an address information ID for identifying this piece of address information is pre-assigned correspondingly, without duplicative ID assignment among these pieces of address information. With this configuration, even if pieces of job information are stored in the second storage unit 22, based on the correspondence information, the second control unit 21 is able to easily find the job information that includes the image information corresponding to the address information. As described earlier, job information includes a single piece of image information and two or more pieces of address information. Therefore, the second control unit 21 may find the job information that includes the image information corresponding to the address information by using other method instead of the above method using the correspondence information.

The job information explained above may be configured to include second correspondence information that provides a correspondence between the image information included in the job information and an address information group that is a set of the two or more pieces of address information included in the job information. For example, the second correspondence information is information for association between an image information ID for identifying the image information and an address information group ID for identifying an address information group that is a set of the two or more pieces of address information. With this configuration, even if pieces of job information are stored in the second storage unit 22, based on the second correspondence information, the second control unit 21 is able to easily find the job information that includes the image information corresponding to the address information included in the address information group identified by the address information group ID.

Figure 4:
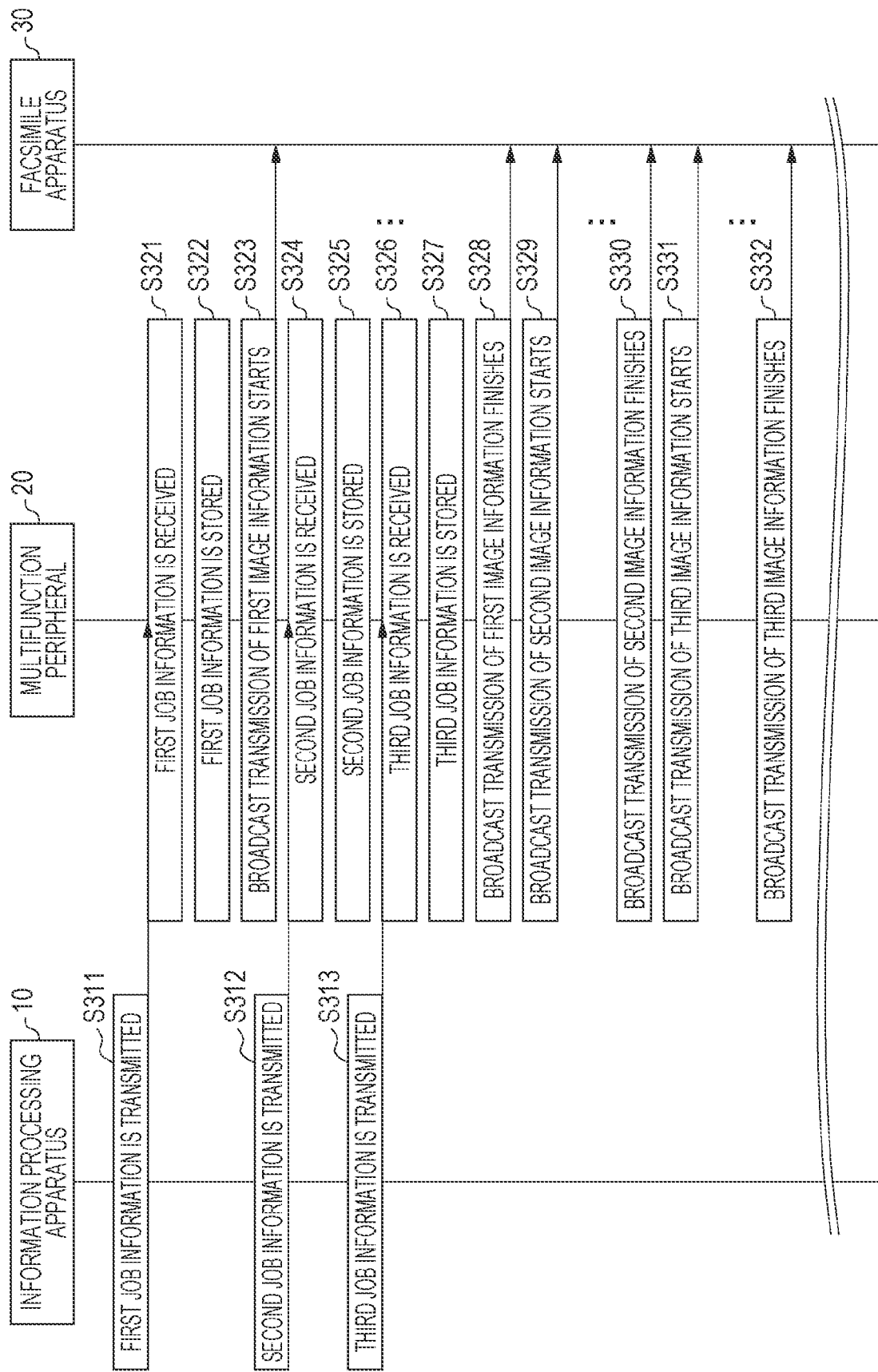
FIG. 4 is a sequence chart that illustrates an example of the flow of processing performed by the information processing apparatus and the multifunction peripheral regarding the transmission and reception of job information.

Processing Performed by Information Processing Apparatus and Multifunction Peripheral Regarding Transmission and Reception of Job Information Processing performed by the information processing apparatus 10 and the multifunction peripheral 20 regarding the transmission and reception of job information will now be explained, wherein a case where the information processing apparatus 10 and the multifunction peripheral 20 execute processes in accordance with the flow illustrated in FIG. 4 is taken as an example. FIG. 4 is a sequence chart that illustrates an example of the flow of processing performed by the information processing apparatus 10 and the multifunction peripheral 20 regarding the transmission and reception of job information. To simplify the illustration, in FIG. 4, a facsimile apparatus 30 is illustrated as a representative example of a plurality of other apparatuses to which image information is transmitted from the multifunction peripheral 20 by facsimile communication.

In accordance with a received input of an operation, the information processing apparatus 10 transmits the first job information mentioned above to the multifunction peripheral 20 (step S311).

Next, the multifunction peripheral 20 receives, from the information processing apparatus 10, the first job information transmitted in the step S311 by the information processing apparatus 10 (step S321).

Figure 5:
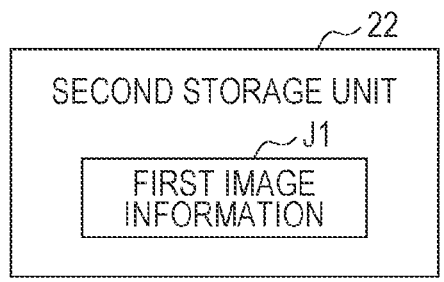
FIG. 5 is a diagram that illustrates an example of image information stored in the memory area of a second storage unit immediately after the execution of processing in a step S322.

Next, the multifunction peripheral 20 causes the second storage unit 22 to store the first job information received in the step S321 (step S322). In the memory area of the second storage unit 22 immediately after the execution of processing in the step S322, a single piece of first image information is stored as illustrated in FIG. 5. FIG. 5 is a diagram that illustrates an example of image information stored in the memory area of the second storage unit 22 immediately after the execution of processing in the step S322. First image information J1 illustrated in FIG. 5 is an example of the first image information. That is, in the memory area of the second storage unit 22 immediately after the execution of processing in the step S322, N pieces of first image information the number of which is the same as the number of pieces of first address information included in the first job information are not stored. Only a single piece of first image information is stored. As explained here, in the communication system 1, the number of pieces of image information to be stored into the second storage unit 22 of the multifunction peripheral 20 does not increase even if the number of transmission destinations in broadcast transmission increases. Consequently, the communication system 1 is able to prevent the shortage of memory capacity of the second storage unit 22 of the multifunction peripheral 20 in broadcast transmission.

Next, based on the first job information stored by the second storage unit 22 in the step S322, the multifunction peripheral 20 starts broadcast transmission of the first image information by facsimile communication to the addresses indicated respectively by the N pieces of first address information (step S323).

Next, in the example illustrated in FIG. 4, in accordance with a received input of an operation, the information processing apparatus 10 transmits second job information to the multifunction peripheral 20 (step S312) at a point in time before the completion of the broadcast transmission of the first image information by facsimile communication started by the multifunction peripheral 20 in the step S323. The second job information is information that includes a single piece of second image information and M pieces of second address information. The term "M pieces of second address information" means M pieces of address information different from one another, the specifying of which is received from the user via the receiving image together with the specifying of the second image information. M may be any integer as long as it is not less than 1. The M pieces of second address information may be different from the N pieces of first address information included in the first job information either partially or entirely. The M pieces of second address information may be the same as the N pieces of first address information included in the first job information either partially or entirely.

Next, the multifunction peripheral 20 receives, from the information processing apparatus 10, the second job information transmitted in the step S312 by the information processing apparatus 10 (step S324).

Figure 6:
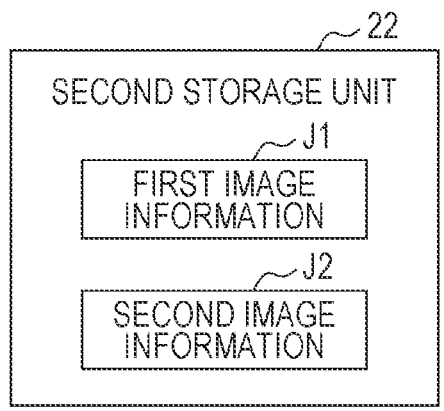
FIG. 6 is a diagram that illustrates an example of image information stored in the memory area of the second storage unit immediately after the execution of processing in a step S325.

Next, the multifunction peripheral 20 causes the second storage unit 22 to store the second job information received in the step S324 (step S325). In the memory area of the second storage unit 22 immediately after the execution of processing in the step S325, two pieces of image information, specifically, the single piece of first image information and the single piece of second image information, are stored as illustrated in FIG. 6. FIG. 6 is a diagram that illustrates an example of image information stored in the memory area of the second storage unit 22 immediately after the execution of processing in the step S325. Second image information J2 illustrated in FIG. 6 is an example of the second image information. That is, in the memory area of the second storage unit 22 immediately after the execution of processing in the step S325, N pieces of first image information the number of which is the same as the number of pieces of first address information included in the first job information are not stored. In addition, M pieces of second image information the number of which is the same as the number of pieces of second address information included in the second job information are not stored in this memory area. Two pieces of image information, specifically, the single piece of first image information and the single piece of second image information, are stored in this memory area. As explained here, in the communication system 1, the number of pieces of image information to be stored into the second storage unit 22 of the multifunction peripheral 20 does not increase even if pieces of job information are received and the number of transmission destinations in broadcast transmission based on these pieces of job information increases. Consequently, the communication system 1 is able to prevent the shortage of memory capacity of the second storage unit 22 of the multifunction peripheral 20 in broadcast transmission.

In the example illustrated in FIG. 4, after the execution of processing in the step S325, the multifunction peripheral 20 has not yet completed the facsimile transmission of the first image information, which was started in the step S323. Therefore, the multifunction peripheral 20 does not perform the broadcast transmission of the second image information by facsimile communication until the broadcast transmission of the first image information by facsimile communication finishes in a step S328 described later.

Next, in the example illustrated in FIG. 4, in accordance with a received input of an operation, the information processing apparatus 10 transmits third job information to the multifunction peripheral 20 at the following point in time (step S313): before the completion of the broadcast transmission of the first image information by facsimile communication started by the multifunction peripheral 20 in the step S323, but after the execution of processing in the step S325 by the multifunction peripheral 20. The third job information is information that includes a single piece of third image information and L pieces of third address information. The term "L pieces of third address information" means L pieces of address information different from one another, the specifying of which is received from the user via the receiving image together with the specifying of the third image information. L may be any integer as long as it is not less than 1. The L pieces of third address information may be different from the N pieces of first address information included in the first job information either partially or entirely. The L pieces of third address information may be the same as the N pieces of first address information included in the first job information either partially or entirely. The L pieces of third address information may be different from the M pieces of second address information included in the second job information either partially or entirely. The L pieces of third address information may be the same as the M pieces of second address information included in the second job information either partially or entirely.

Next, the multifunction peripheral 20 receives, from the information processing apparatus 10, the third job information transmitted in the step S313 by the information processing apparatus 10 (step S326).

Figure 7:
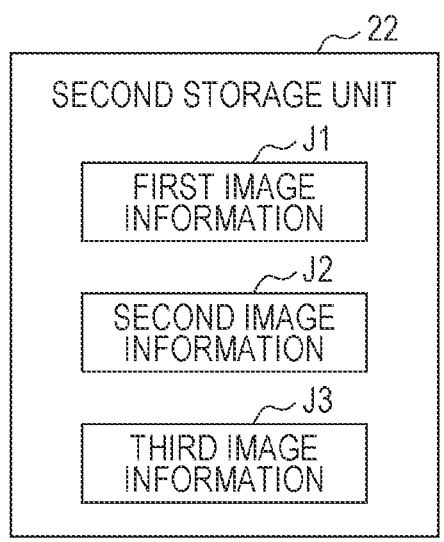
FIG. 7 is a diagram that illustrates an example of image information stored in the memory area of the second storage unit immediately after the execution of processing in a step S327.

Next, the multifunction peripheral 20 causes the second storage unit 22 to store the third job information received in the step S326 (step S327). In the memory area of the second storage unit 22 immediately after the execution of processing in the step S327, three pieces of image information, specifically, the single piece of first image information and the single piece of second image information and the single piece of third image information, are stored as illustrated in FIG. 7. FIG. 7 is a diagram that illustrates an example of image information stored in the memory area of the second storage unit 22 immediately after the execution of processing in the step S327. Third image information J3 illustrated in FIG. 7 is an example of the third image information. That is, in the memory area of the second storage unit 22 immediately after the execution of processing in the step S327, N pieces of first image information the number of which is the same as the number of pieces of first address information included in the first job information are not stored. In addition, M pieces of second image information the number of which is the same as the number of pieces of second address information included in the second job information are not stored in this memory area. In addition, L pieces of third image information the number of which is the same as the number of pieces of third address information included in the third job information are not stored in this memory area. Three pieces of image information, specifically, the single piece of first image information and the single piece of second image information and the single piece of third image information, are stored in this memory area. As explained here, in the communication system 1, the number of pieces of image information to be stored into the second storage unit 22 of the multifunction peripheral 20 does not increase even if the number of transmission destinations in broadcast transmission increases. Consequently, the communication system 1 is able to prevent the shortage of memory capacity of the second storage unit 22 of the multifunction peripheral 20 in broadcast transmission.

Next, in the example illustrated in FIG. 4, the multifunction peripheral 20 finishes the broadcast transmission of the first image information by facsimile communication, which was started in the step S323 (step S328).

Next, based on the second job information stored by the second storage unit 22 in the step S325, the multifunction peripheral 20 starts broadcast transmission of the second image information by facsimile communication to the addresses indicated respectively by the M pieces of second address information (step S329).

Next, in the example illustrated in FIG. 4, the multifunction peripheral 20 finishes the broadcast transmission of the second image information by facsimile communication, which was started in the step S329 (step S330).

Next, based on the third job information stored by the second storage unit 22 in the step S327, the multifunction peripheral 20 starts broadcast transmission of the third image information by facsimile communication to the addresses indicated respectively by the L pieces of third address information (step S331).

Next, in the example illustrated in FIG. 4, the multifunction peripheral 20 finishes the broadcast transmission of the third image information by facsimile communication, which was started in the step S331 (step S332).

As explained above, the communication system 1 includes the information processing apparatus 10 and the multifunction peripheral 20, which is connected to the information processing apparatus 10. The information processing apparatus 10 transmits, to the multifunction peripheral 20, first job information that includes a single piece of first image information and N pieces of first address information that respectively indicate the addresses of transmission destinations of the first image information. When the first job information is received from the information processing apparatus 10, based on the received first job information, the multifunction peripheral 20 broadcasts the first image information by facsimile communication to the addresses indicated respectively by the N pieces of first address information. By this means, the communication system 1 is able to prevent the shortage of memory capacity of the multifunction peripheral 20 in broadcast transmission.

The multifunction peripheral 20 explained above may, for example, be configured to cause the second storage unit 22 to store first job history information, which indicates the history of the first job information stored in the second storage unit 22, when the broadcast transmission that was started in the step S323 in FIG. 4 finishes in the step S328. In this configuration, the multifunction peripheral 20 keeps the first job history information stored in the second storage unit 22 until a lapse of a predetermined storage period from the storage of the first job history information into the second storage unit 22. Then, upon the lapse of the predetermined storage period from the storage of the first job history information into the second storage unit 22, the multifunction peripheral 20 deletes the first job history information from the second storage unit 22. In this configuration, first job identification information for identifying the first job information is associated with the first job information. That is, when the first job information is generated in this configuration, the information processing apparatus 10 generates the first job information as information with which the first job identification information is associated. Alternatively, for example, when the first job history information is stored into the second storage unit 22, the multifunction peripheral 20 may keep the first job information stored in the second storage unit 22 as the first job history information.

When the first job information is transmitted to the multifunction peripheral 20, the information processing apparatus 10 described above may be configured to cause the first storage unit 12 to store the first job history information described above. In this configuration, after causing the first storage unit 12 to store the first job history information, in accordance with a received input of an operation, based on the first job history information stored in the first storage unit 12, the information processing apparatus 10 generates second job information that includes the first job identification information mentioned here and a single piece of second image information. That is, this second job information does not include any address information. The information processing apparatus 10 transmits this second job information to the multifunction peripheral 20. Upon acquiring the second job information that includes the first job identification information, based on the received second job information, the multifunction peripheral 20 reads the first job history information out of the second storage unit 22. Based on the read first job history information and the second image information, the multifunction peripheral 20 broadcasts the second image information by facsimile communication to the addresses indicated respectively by the N pieces of first address information, that is, the addresses of the transmission destinations of the first job information. By this means, the communication system 1 is able to reuse the pieces of address information that were used in the past broadcast transmission, thereby more reliably preventing the shortage of memory capacity of the multifunction peripheral 20 in broadcast transmission. The communication system 1 may be configured to reuse a part of the pieces of address information that were used in the past broadcast transmission.

Processing of Displaying Status Image by Information Processing Apparatus about Broadcast Transmission Performed by Multifunction Peripheral Next, processing of displaying a status image by the information processing apparatus 10 about broadcast transmission performed by the multifunction peripheral 20 will now be explained. In the description below, to facilitate an explanation, a status image about broadcast transmission performed by the multifunction peripheral 20 is simply referred to as a status image.

The status image is an image which the information processing apparatus 10 is able to display when broadcast transmission by facsimile communication is performed by the multifunction peripheral 20. The information processing apparatus 10 displays a status image in accordance with a received input of an operation when the broadcast transmission mentioned here is performed.

The status image is an image including information regarding broadcast transmission performed by the multifunction peripheral 20. For example, the status image is an image including, as such information, status information for each of the addresses of transmission destinations to which image information is to be transmitted by broadcast transmission performed by the multifunction peripheral 20. Status information for a certain address contains, for example, address information that indicates this address, communication state information that indicates the state of facsimile communication to this address, and communication progress information that indicates the progress of facsimile communication to this address, etc. The status information for this address may contain other kind of information corresponding to facsimile communication to this address in place of part or all of the address information, the communication state information, and the communication progress information, or in addition to part or all of the address information, the communication state information, and the communication progress information.

FIG. 8 is a diagram that illustrates an example of a status image. As illustrated in FIG. 8, a status image includes status information for each of the addresses of a plurality of transmission destinations to which image information is to be transmitted by broadcast transmission performed by the multifunction peripheral 20. In the example illustrated in FIG. 8, status information includes three kinds of information, that is, address information, communication state information, and communication progress information. In the illustrated example, the status image is displayed as a table that contains status information for each of the addresses of the plurality of transmission destinations. In each record in the table, status information for the address is stored.

For example, the record enclosed by dotted lines D1 in FIG. 8 is a record in which status information for the address indicated by address information "xxx1" is stored. Therefore, this record includes "broadcast transmission" that is the communication state information for this address and "transmitting now" that is the communication progress information for this address, in addition to the address information "xxx1". The communication state information for this address, "broadcast transmission", is communication state information that indicates that the transmission of image information to this address has not been completed yet. The communication progress information for this address, "transmitting now", is communication progress information that indicates that the image information is currently being transmitted to this address. The communication progress information for this address, "transmitting now", may be configured to include thenumber-of-transmission-completed-pages information, which indicates the number of pages for which transmission has been completed, among a plurality of pages of the image represented by the image information that is being transmitted.

As another example, the record enclosed by dotted lines D2 in FIG. 8 is a record in which status information for the address indicated by address information "xxx3" is stored. Therefore, this record includes "broadcast transmission" that is the communication state information for this address and "waiting now to redial" that is the communication progress information for this address, in addition to the address information "xxx3". The communication progress information for this address, "waiting now to redial", is communication progress information that indicates standby until predetermined redialing wait time elapses because facsimile communication to this address cannot be performed immediately for the reason of, for example, being on another call. The communication progress information for this address, "waiting now to redial", may be configured to include time-left information, which indicates the time left until the predetermined redialing wait time elapses. The multifunction peripheral 20 performs the transmission of the image information to this address again upon the lapse of the time indicated by the time-left information.

The information processing apparatus 10 generates the status image illustrated in FIG. 8 by receiving, from the multifunction peripheral 20, status information for each of the addresses of the plurality of transmission destinations to which the image information is to be transmitted by broadcast transmission performed by the multifunction peripheral 20 either by polling from the information processing apparatus 10 to the multifunction peripheral 20 or by pushing from the multifunction peripheral 20 to the information processing apparatus 10. A known method may be used for generating the status information by the information processing apparatus 10 based on the received status information. A method to be developed in future may be used instead.

Figure 9:
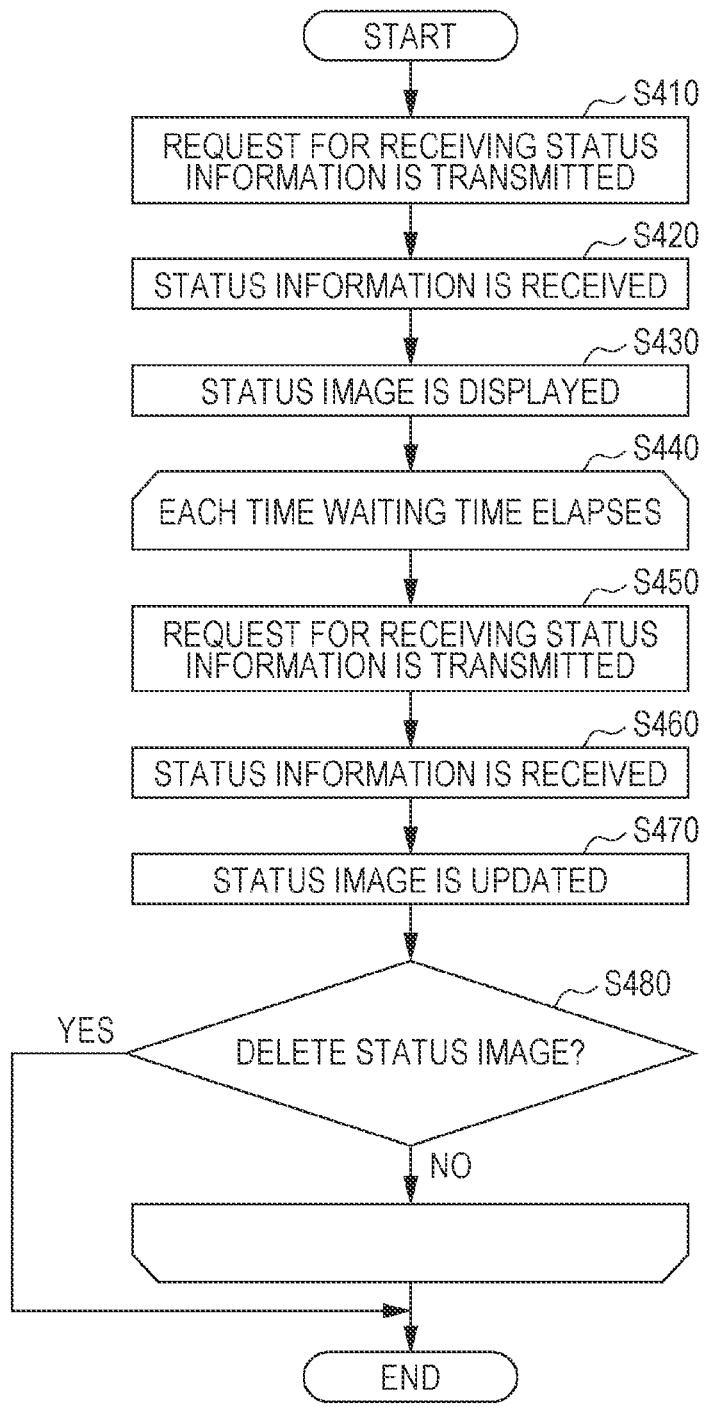
FIG. 9 is a diagram that illustrates an example of the flow of processing for displaying a status image by the information processing apparatus.

FIG. 9 is a diagram that illustrates an example of the flow of processing for displaying a status image by the information processing apparatus 10. In the description below, it is assumed that broadcast transmission by facsimile communication based on the first job information was started by the multifunction peripheral 20 at a point in time that is before the execution of processing in a step S410 illustrated in FIG. 9. In the description below, as an example, it is assumed that an input of an operation for displaying a status image was received by the information processing apparatus 10 at this point in time. In the description below, as an example, it is further assumed that the information processing apparatus 10 receives status information for each of the addresses from the multifunction peripheral 20 by polling.

The first control unit 11 transmits, to the multifunction peripheral 20, a request for receiving status information contained in a status information table stored in the multifunction peripheral 20 (step S410). The processing performed in the step S410 will now be explained.

The status information table is a table that stores status information of each of channels which the facsimile communication unit 26 of the multifunction peripheral 20 has. In the present embodiment, as described earlier, the number of channels which the facsimile communication unit 26 has is three. Therefore, in the present embodiment, the status information table is a table that stores status information of each of the three channels which the facsimile communication unit 26 of the multifunction peripheral 20 has. The status information of a certain channel is status information for the address of the transmission destination to which image information is transmitted via this channel. That is, the status information table is a table that stores status information for each of the three addresses. The status information stored in the status information table is updated each time a predetermined update cycle period elapses from the start to the end of broadcast transmission by the multifunction peripheral 20. That is, the status information of a certain channel is updated into status information for the next address when there is a change from the address of the transmission destination to which the image information is transmitted via this channel to the next address. The status information of this channel is updated also when either communication state information or communication progress information about facsimile communication via this channel to the address of the transmission destination to which the image information is transmitted via this channel changes.

FIG. 10 is a diagram that illustrates an example of a status information table. In the example illustrated in FIG. 10, the status information table contains status information of each of the three channels which the facsimile communication unit 26 of the multifunction peripheral 20 has. In the example illustrated in FIG. 10, status information includes address information, communication state information, and communication progress information, etc. In the illustrated example, the communication progress information includes thenumber-of-transmission-completed-pages information mentioned earlier (the number of already-transmitted pages/total pages). In the illustrated example, status information for the corresponding one of the three channels is stored in each record of the status information table. In the status information table illustrated in FIG. 10, the status information of the first channel 261 identified by channel ID "ch1" is status information for the address indicated by the address information "xxx1". In the status information table illustrated in FIG. 10, the status information of the second channel 262 identified by channel ID "ch2" is status information for the address indicated by the address information "xxx2". In the status information table illustrated in FIG. 10, the status information of the third channel 263 identified by channel ID "ch3" is status information for the address indicated by the address information "xxx3".

If the three channels of the facsimile communication unit 26 of the multifunction peripheral 20 include any channel that is not in use, the status information of the channel that is not in use may contain information indicating "not in use" or may contain other kind of information corresponding to "not in use".

In the step S410, the first control unit 11 transmits a request for receiving status information contained in the status information table explained above to the multifunction peripheral 20. The first control unit 11 may be configured to transmit a request for receiving the status information table to the multifunction peripheral 20. The status information table may be, in place of information in a table format, information in other kind of format that contains status information of each of the channels which the facsimile communication unit 26 of the multifunction peripheral 20 has.

After performing the processing in the step S410, the first control unit 11 receives status information of each of the three channels of the facsimile communication unit 26 of the multifunction peripheral 20 from the multifunction peripheral 20 as a response to the request that was transmitted to the multifunction peripheral 20 in the step S410 (step S420).

Next, based on the status information of each of the three channels received in the step S420, the first control unit 11 generates a status image. Then, the first control unit 11 causes the first display unit 15 to display the generated status image (step S430). The status information of these three channels is status information for three addresses among the addresses indicated respectively by the N pieces of address information as described earlier. Therefore, for example, the information processing apparatus 10 uses predetermined "waiting" status information as status information for the addresses indicated respectively by the (N-3) pieces of address information, which is not included in the status information of these three channels. The "waiting" status information is information that includes "broadcast transmission" as the communication state information and "waiting" as the communication progress information in addition to the address information indicating the address. In this example, the first control unit 11 generates the status image based on the status information of each of the three channels and the (N-3) pieces of the "waiting" status information. Any other method may be used for generating the status image based on the status information of each of the three channels.

Next, the first control unit 11 repeats a series of processing in steps S450, S460, and S470 as processing for updating the status image repeatedly each time predetermined waiting time elapses (step S440). It will be advantageous if the predetermined waiting time is longer than the predetermined update cycle period mentioned earlier. In other words, it will be advantageous if the predetermined update cycle period is shorter than the predetermined waiting time. If configured in this way, the information processing apparatus 10 is able to reflect the content of the update of the status information table into the status image without a delay when the status information table stored in the multifunction peripheral 20 is updated.

Upon determining that the predetermined waiting time has elapsed, the first control unit 11 transmits, to the multifunction peripheral 20, a request for receiving status information contained in the status information table stored in the multifunction peripheral 20 (step S450). Since the processing in the step S450 is the same as the processing in the step S410, an explanation is not given here.

Next, the first control unit 11 receives status information of each of the three channels of the facsimile communication unit 26 of the multifunction peripheral 20 from the multifunction peripheral 20 as a response to the request that was transmitted to the multifunction peripheral 20 in the step S450 (step S460).

Next, based on the status information of each of the three channels received in the step S460, the first control unit 11 generates a status image. Then, the first control unit 11 causes the first display unit 15 to delete the status image that is currently displayed on the first display unit 15 and causes the first display unit 15 to display the newly-generated status image. That is, after performing the processing in the step S460, the first control unit 11 updates the status image (step S470).

Next, the first control unit 11 determines whether or not to delete the status image displayed on the first display unit 15 from the first display unit 15 (step S480). For example, if an input of an operation for deleting the status image from the first display unit 15 has been received, the first control unit 11 determines that the status image should be deleted from the first display unit 15. If an input of an operation for deleting the status image from the first display unit 15 has not been received, the first control unit 11 determines that the status image should not be deleted from the first display unit 15.

Upon determining that the status image displayed on the first display unit 15 should not be deleted from the first display unit 15 (step S480: NO), the first control unit 11 causes the process to return to the step S440, and waits until the predetermined waiting time elapses.

Upon determining that the status image displayed on the first display unit 15 should be deleted from the first display unit 15 (step S480: YES), the first control unit 11 causes the first display unit 15 to delete the status image, and then ends the process in the flowchart illustrated in FIG. 9.

As explained above, in accordance with a received input of an operation, the information processing apparatus 10 is able to cause the first display unit 15 to display a status image. Based on the status image, the user of the information processing apparatus 10 is able to easily know the progress of broadcast transmission which, via the information processing apparatus 10, the user instructed the multifunction peripheral 20 to execute.

The processing in the steps S410 and S420 is processing performed by the first control unit 11 to receive status information from the multifunction peripheral 20 by polling. In a related-art communication system, for example, a related-art information processing apparatus periodically receives status information for each of the addresses of a plurality of transmission destinations to which image information is to be transmitted in broadcast transmission performed by a related-art multifunction peripheral from the related-art multifunction peripheral for each of the addresses of the plurality of transmission destinations. For this reason, in the related-art communication system, if the number of the plurality of transmission destinations increases, the load of communication between the related-art information processing apparatus and the related-art multifunction peripheral also increases. In the communication system 1, the information processing apparatus 10 displays a status image by periodically receiving three pieces of status information contained in a status information table from the multifunction peripheral 20. For this reason, in the communication system 1, even if the number of a plurality of transmission destinations to which image information is to be transmitted in broadcast transmission performed by the multifunction peripheral 20 increases, the load of communication between the information processing apparatus 10 and the multifunction peripheral 20 does not increase. Namely, the communication system 1 is able to prevent the load of communication performed between the information processing apparatus 10 and the multifunction peripheral 20 for displaying the status image from increasing due to an increase in the number of the plurality of transmission destinations.

Processing for Generating and Updating Status Information Table by Multifunction Peripheral Next, with reference to FIG. 11, processing for generating a status information table and updating the status information table by the multifunction peripheral 20 will now be explained. FIG. 11 is a diagram that illustrates an example of the flow of processing for generating a status information table and updating the status information table by the multifunction peripheral 20.

The second control unit 21 acquires status information of each of the three channels of the facsimile communication unit 26 from the facsimile communication unit 26 (step S510). A known method may be used for acquiring status information of each of the three channels from the facsimile communication unit 26. A method to be developed in future may be used instead.

Next, based on the status information of each of the three channels acquired in the step S510, the second control unit 21 generates a status information table (step S520). Then, the second control unit 21 causes the second storage unit 22 to store the generated status information table. A known method may be used for generating a status information table based on the status information of each of the three channels. A method to be developed in future may be used instead.

Next, the second control unit 21 repeats a series of processing in steps S540, S550, and S560 as processing for updating the status information table stored in the second storage unit 22 repeatedly each time a predetermined update cycle period elapses (step S530).

The second control unit 21 acquires status information of each of the three channels of the facsimile communication unit 26 from the facsimile communication unit 26 (step S540). Since the processing in the step S540 is the same as the processing in the step S510, an explanation is not given here.

Next, based on the status information of each of the three channels acquired in the step S540, the second control unit 21 generates a status information table afresh (step S520). Then, the second control unit 21 causes the second storage unit 22 to delete the stored status information table and store the newly-generated status information table. That is, after the processing in the step S540 is performed, the status information table stored in the second storage unit 22 is updated (step S550).

Next, the second control unit 21 determines whether the broadcast transmission by facsimile communication has ended or not (step S560). For example, if the transmission of the first image information to all of the plurality of transmission destinations to which the first image information is addressed by the already-started broadcast transmission has finished, the second control unit 21 determines that the broadcast transmission by facsimile communication has ended. If the transmission of the first image information to all of the plurality of transmission destinations to which the first image information is addressed by the already-started broadcast transmission has not finished yet, the second control unit 21 determines that the broadcast transmission by facsimile communication has not ended yet.

Upon determining that the broadcast transmission by facsimile communication has not ended yet (step S560: NO), the second control unit 21 causes the process to return to the step S530, and waits until the predetermined update cycle period elapses.

Upon determining that the broadcast transmission by facsimile communication has ended (step S560: YES), the second control unit 21 ends the process in the flowchart illustrated in FIG. 11.

As explained above, the multifunction peripheral 20 generates a status information table and updates the status information table. By this means, the communication system 1 is able to prevent the load of communication performed between the information processing apparatus 10 and the multifunction peripheral 20 for displaying a status image from increasing due to an increase in the number of a plurality of transmission destinations to which image information is to be transmitted by broadcast transmission.

As explained above, a communication system according to an exemplary embodiment includes an information processing apparatus and a facsimile apparatus connected to the information processing apparatus; the information processing apparatus transmits, to the facsimile apparatus, first job information that includes a single piece of first image information and includes two or more pieces of address information that respectively indicate addresses of transmission destinations of the first image information; when the first job information is received from the information processing apparatus, based on the two or more pieces of address information that are included in the received first job information, the facsimile apparatus broadcasts the first image information by facsimile communication to the addresses indicated respectively by the two or more pieces of address information. By this means, the communication system is able to prevent the shortage of memory capacity of the facsimile apparatus in broadcast transmission. In the example explained above, the communication system 1 is an example of a communication system. In the example explained above, the information processing apparatus 10 is an example of an information processing apparatus. In the example explained above, the multifunction peripheral 20 is an example of a facsimile apparatus. In the example explained above, the first image information J1 is an example of first image information.

The communication system may be configured such that the first job information further includes correspondence information for association between each of the two or more pieces of address information and the single piece of the first image information.

The communication system may be configured as follows: when the facsimile apparatus broadcasts the first image information by facsimile communication to the addresses indicated respectively by the two or more pieces of address information based on the first job information, the facsimile apparatus causes a second storage unit to store first job history information that indicates a history of the first job information; when the information processing apparatus transmits the first job information to the facsimile apparatus, the information processing apparatus causes a first storage unit to store the first job history information, and, after causing the first storage unit to store the first job history information, based on the first job history information stored in the first storage unit, the information processing apparatus transmits second job information that includes first job identification information and a single piece of second image information, the first job identification information being information for identifying the first job information; and when the second job information is received, based on the received second job information, the facsimile apparatus reads the first job history information out of the second storage unit, and, based on the read first job history information and the second image information, the facsimile apparatus broadcasts the second image information by facsimile communication to the addresses indicated respectively by the two or more pieces of address information, which are the addresses of the transmission destinations for the first job information. In the example explained above, the second storage unit 22 is an example of a second storage unit. In the example explained above, the first storage unit 12 is an example of a first storage unit.

The communication system may be configured as follows: the facsimile apparatus includes one or more ports via which facsimile communication is performed; when the facsimile apparatus broadcasts the first image information by facsimile communication to the addresses indicated respectively by the first address information and the second address information, the facsimile apparatus stores status information of the port each time predetermined first time elapses; and the information processing apparatus receives the status information of the port from the facsimile apparatus each time predetermined second time elapses, and, based on the received status information, the information processing apparatus causes a display unit to display information regarding facsimile communication for each of the addresses indicated respectively by the first address information and the second address information. In the example explained above, each of the first channel 261, the second channel 262, and the third channel 263 is an example of one of a plurality of ports. In the example explained above, the predetermined update cycle period is an example of first time. In the example explained above, the predetermined waiting time is an example of second time. In the example explained above, status information for each of addresses, included in a status image, is an example of information regarding facsimile communication for each of the addresses. In the example explained above, the first display unit 15 is an example of a display unit.

The communication system may be configured such that the predetermined first time is shorter than the predetermined second time.

A facsimile apparatus according to an exemplary embodiment is connected to an information processing apparatus and is configured to, when first job information that includes a single piece of first image information and includes two or more pieces of address information that respectively indicate addresses of transmission destinations of the first image information is received from the information processing apparatus, based on the received first job information, broadcast the first image information by facsimile communication to the addresses indicated respectively by the two or more pieces of address information. In this example, the facsimile apparatus is able to prevent the shortage of its own memory capacity in broadcast transmission.

Though some embodiments of the present disclosure are explained in detail above with reference to the accompanying drawings, their specific configurations are not limited to those of the embodiments. Modifications, replacement, deletion, etc. without departing from the gist of the present disclosure may be applied.

A program for realizing the functions of any of the components of the apparatuses described above may be stored into a computer-readable recording medium, and the program may be read to be executed by a computer system. The apparatuses mentioned here are, for example, the information processing apparatus 10 and the multifunction peripheral 20, etc. The "computer system" mentioned here encompasses OS (Operating System) and hardware such as peripheral equipment. The "computer-readable recording medium" mentioned here means a portable medium such as flexible disk, magnetic optical disk, ROM, CD-ROM (Compact Disk), etc. or a storage device such as a hard disk, etc. built in a computer system. The "computer-readable recording medium" mentioned here encompasses a medium that keeps a program stored for a defined period of time such as a volatile memory in a computer system serving as a server or a client in a case where the program is transmitted via a network such as the Internet or via a communication channel such as a telephone line.

The program may be transmitted from a computer system in which the program is stored in a storage device, etc. to another computer system via a transmission medium or by means of a transmission wave in a transmission medium. The "transmission medium" transmitting the program mentioned here means a medium that has a function of transmitting information, for example, a network such as the Internet or a communication channel such as a telephone line.

The program may realize a part of the foregoing functions. The program may be one that realizes the foregoing functions by being combined with a program that has already been recorded in the computer system, that is, may be a so-called difference file or a difference program.

What is claimed is:

1. A communication system, comprising:
    an information processing apparatus; and
    a facsimile apparatus connected to the information processing apparatus, wherein
        the information processing apparatus transmits, to the facsimile apparatus, first job information that includes a single piece of first image information and includes first address information and second address information that respectively indicate addresses of transmission destinations of the first image information,
        when the first job information is received from the information processing apparatus, based on the first address information and the second address information that are included in the received first job information, the facsimile apparatus broadcasts the first image information by facsimile communication to the addresses indicated respectively by the first address information and the second address information,
        when the facsimile apparatus broadcasts the first image information by the facsimile communication to the addresses indicated respectively by the first address information and the second address information based on the first job information, the facsimile apparatus causes a second storage unit to store first job history information that indicates a history of the first job information,
        when the information processing apparatus transmits the first job information to the facsimile apparatus, the information processing apparatus causes a first storage unit to store the first job history information, and, after causing the first storage unit to store the first job history information, based on the first job history information stored in the first storage unit, the information processing apparatus transmits second job information that includes first job identification information and a single piece of second image information to the facsimile apparatus, the first job identification information being information for identifying the first job information, and
        when the second job information is received, based on the received second job information, the facsimile apparatus reads the first job history information out of the second storage unit, and, based on the read first job history information and the second image information, the facsimile apparatus broadcasts the second image information by the facsimile communication to the addresses indicated respectively by the first address information and the second address information, which are the addresses of the transmission destinations for the first job information.

2. The communication system according to claim 1, wherein
    the first job information further includes correspondence information for association between each of the first address information and the second address information and the single piece of the first image information.

3. The communication system according to claim 1, wherein
    the facsimile apparatus includes one or more ports via which the facsimile communication is performed,
    when the facsimile apparatus broadcasts the first image information by the facsimile communication to the addresses indicated respectively by the first address information and the second address information, the facsimile apparatus stores status information of the port each time predetermined first time elapses, and
    the information processing apparatus receives the status information of the port from the facsimile apparatus each time predetermined second time elapses, and, based on the received status information, the information processing apparatus causes a display unit to display information regarding the facsimile communication for each of the addresses indicated respectively by the first address information and the second address information.

4. The communication system according to claim 3, wherein
    the predetermined first time is shorter than the predetermined second time.

5. A method for controlling a communication system that includes an information processing apparatus and a facsimile apparatus connected to the information processing apparatus, the method comprising:
    transmitting, by the information processing apparatus to the facsimile apparatus, first job information that includes a single piece of first image information and includes first address information and second address information that respectively indicate addresses of transmission destinations of the first image information;
    when the first job information is received by the facsimile apparatus from the information processing apparatus, based on the first address information and the second address information that are included in the received first job information, broadcasting the first image information by facsimile communication by the facsimile apparatus to the addresses indicated respectively by the first address information and the second address information;
    when the facsimile apparatus broadcasts the first image information by the facsimile communication to the addresses indicated respectively by the first address information and the second address information based on the first job information, causing, by the facsimile apparatus, a second storage unit to store first job history information that indicates a history of the first job information;
    when the information processing apparatus transmits the first job information to the facsimile apparatus, causing, by the information processing apparatus, a first storage unit to store the first job history information, and, after causing the first storage unit to store the first job history information, based on the first job history information stored in the first storage unit, the information processing apparatus transmits second job information that includes first job identification information and a single piece of second image information to the facsimile apparatus, the first job identification information being information for identifying the first job information; and when the second job information is received, based on the received second job information, reading, by the facsimile apparatus, the first job history information out of the second storage unit, and, based on the read first job history information and the second image information, broadcasting, by the facsimile apparatus, the second image information by the facsimile communication to the addresses indicated respectively by the first address information and the second address information, which are the addresses of the transmission destinations for the first job information.

6. A communication system, comprising:

an information processing apparatus; and a facsimile apparatus connected to the information processing apparatus, wherein the information processing apparatus transmits, to the facsimile apparatus, first job information that includes a single piece of first image information and includes first address information and second address information that respectively indicate addresses of transmission destinations of the first image information, when the first job information is received from the information processing apparatus, based on the first address information and the second address information that are included in the received first job information, the facsimile apparatus broadcasts the first image information by facsimile communication to the addresses indicated respectively by the first address information and the second address information, the facsimile apparatus includes one or more ports via which the facsimile communication is performed, when the facsimile apparatus broadcasts the first image information by the facsimile communication to the addresses indicated respectively by the first address information and the second address information, the facsimile apparatus stores status information of the one or more ports each time a predetermined update time elapses, the information processing apparatus receives the status information of the one or more ports from the facsimile apparatus each time a predetermined waiting time elapses, and, based on the received status information, the information processing apparatus causes a display unit to display information regarding the facsimile communication for each of the addresses indicated respectively by the first address information and the second address information, and the predetermined update time is different from the predetermined waiting time.

7. A method for controlling a communication system that includes an information processing apparatus and a facsimile apparatus connected to the information processing apparatus, the method comprising:

transmitting, by the information processing apparatus to the facsimile apparatus, first job information that includes a single piece of first image information and includes first address information and second address information that respectively indicate addresses of transmission destinations of the first image information;

when the first job information is received by the facsimile apparatus from the information processing apparatus, based on the first address information and the second address information that are included in the received first job information, broadcasting the first image information by facsimile communication by the facsimile apparatus to the addresses indicated respectively by the first address information and the second address information, wherein the facsimile apparatus includes one or more ports via which the facsimile communication is performed;

when the facsimile apparatus broadcasts the first image information by the facsimile communication to the addresses indicated respectively by the first address information and the second address information, storing, by the facsimile apparatus, status information of the one or more ports each time a predetermined update time elapses; and receiving, by the information processing apparatus, the status information of the one or more ports from the facsimile apparatus each time a predetermined waiting time elapses, and, based on the received status information, causing, by the information processing apparatus, a display unit to display information regarding the facsimile communication for each of the addresses indicated respectively by the first address information and the second address information, wherein the predetermined update time is different from the predetermined waiting time.

* * * * *